United States Patent
Baur et al.

(10) Patent No.: US 9,965,637 B2
(45) Date of Patent: May 8, 2018

(54) METHOD AND DEVICE FOR ACTIVATING FUNCTIONS OF A CONTROL DEVICE

(71) Applicant: Robert Bosch GmbH, Stuttgart (DE)

(72) Inventors: Heiko Baur, Goeppingen (DE); Debojyoti Bhattacharya, Babusabpalya Kalyanagar Post Bangalore (IN); Sriram Subramanian Neelakantan, Bangalore (IN)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 15/108,395

(22) PCT Filed: Dec. 22, 2014

(86) PCT No.: PCT/EP2014/078982
§ 371 (c)(1),
(2) Date: Jun. 27, 2016

(87) PCT Pub. No.: WO2015/104180
PCT Pub. Date: Jul. 16, 2015

(65) Prior Publication Data
US 2016/0330204 A1 Nov. 10, 2016

(30) Foreign Application Priority Data
Jan. 8, 2014 (DE) .................. 10 2014 200 116

(51) Int. Cl.
*G06F 21/62* (2013.01)
*H04L 29/08* (2006.01)
(Continued)

(52) U.S. Cl.
CPC .............. *G06F 21/62* (2013.01); *H04L 9/14* (2013.01); *H04L 9/30* (2013.01); *H04L 63/06* (2013.01);
(Continued)

(58) Field of Classification Search
CPC ...................................................... G06F 21/62
See application file for complete search history.

(56) References Cited

U.S. PATENT DOCUMENTS 5,552,641 A * 9/1996 Fischer .................. B60R 25/04
180/287
6,353,776 B1 * 3/2002 Rohrl ................. G07C 9/00309
340/426.16
(Continued)

FOREIGN PATENT DOCUMENTS

DE 102004050882 5/2006
DE 102008036678 2/2010

OTHER PUBLICATIONS

Zhou et al.; ZigBee-based Vehicle Access Control System; Published in: Intelligent Information Technology and Security Informatics (IITSI), 2010 Third International Symposium on; 2010 (Year: 2010).*

(Continued)

*Primary Examiner* — Bradley Holder
(74) *Attorney, Agent, or Firm* — Norton Rose Fulbright US LLP; Gerard Messina (57) ABSTRACT

A method for activating at least one function of a control device of a motor vehicle, which includes the steps: a) generating a random value in the control device; b) calculating a reference value from the random value by the control device; c) transmitting the random value to a remote control unit and from the remote control unit to a server; d) verifying the authorization of the remote control unit transmitting the random value by the server and if an authorization of the remote control unit is provided: e) generating a response value from the random value by the server; f) transmitting the response value to the remote control unit and from the remote control unit to the control device; and g) comparing the response value with the reference value (Continued)

and, if the response value matches the reference value, activating the at least one function of the control device.

14 Claims, 2 Drawing Sheets

(51) Int. Cl.
*H04L 29/06* (2006.01)
*H04W 12/04* (2009.01)
*H04W 12/08* (2009.01)
*H04L 9/14* (2006.01)
*H04L 9/30* (2006.01)
*H04W 12/06* (2009.01)

(52) U.S. Cl.
CPC ...... *H04L 63/0823* (2013.01); *H04L 63/0869* (2013.01); *H04L 63/101* (2013.01); *H04L 67/12* (2013.01); *H04L 67/34* (2013.01); *H04W 12/04* (2013.01); *H04W 12/08* (2013.01); *H04L 63/0442* (2013.01); *H04L 63/08* (2013.01); *H04L 63/18* (2013.01); *H04W 12/06* (2013.01)

(56) References Cited

U.S. PATENT DOCUMENTS

| | | | | |
|---|---|---|---|---|
| 6,556,125 | B1* | 4/2003 | Rohrl | G07C 9/00309 340/5.62 |
| 2003/0088353 | A1* | 5/2003 | Heckmann | B60T 8/172 701/48 |
| 2010/0191410 | A1* | 7/2010 | Torlo | H04L 63/10 701/31.7 |

OTHER PUBLICATIONS

Sonnenberg; Service and user interface transfer from nomadic devices to car infotainment systems; Published in: Proceeding AutomotiveUI '10 Proceedings of the 2nd International Conference on Automotive User Interfaces and Interactive Vehicular Applications; pp. 162-165; Nov. 11-12, 2010 (Year: 2010).*
Han et al., "On authentical in a connected vehicle: secure integration of mobile devices with vehicular networks" 2013 ACM/IEEE International Conference on Cyber-Physical Systems (ICCPS), Apr. 8, 2013, 160-169.
Verdult et al., "Dismantling megamos crypto:wirelessly lockpicking a vehicle immobilizer" USENIX, Aug. 2013, 1-28 (p. 1 attached).
International Search Report dated May 28, 2015 in International Application PCT/EP2014/078982, filed Dec. 22, 2014.

* cited by examiner

METHOD AND DEVICE FOR ACTIVATING FUNCTIONS OF A CONTROL DEVICE

FIELD

The present invention relates to a method and a device for activating functions of a control device, in particular a control device of a motor vehicle.

BACKGROUND INFORMATION

When performing vehicle diagnostics with the aid of a control device installed in a vehicle, safety-relevant data and services, in particular, should be available only after they have been activated by the diagnostic software. A typical example of such a safety-relevant function is training a new immobilizer system or downloading a new software version.

The activation usually takes place using a so-called seed/key method, in which the testing device and the control device share a secret algorithm and key. Such a conventional method usually takes place as follows:
1. A data link is established between the control device and a workshop testing device.
2. The diagnostic software in the testing device initiates a request via the data link to the control device to activate a specific safety-relevant function.
3. The control device responds to the test software with a random value.
4. Since the diagnostic software in the testing device knows the secret algorithm, it is capable of calculating the appropriate response from the random value. The testing device returns this response to the control device.
5. The control device verifies the response from the diagnostic software by calculating the response itself from the random value using the secret algorithm and comparing it with the response transmitted from the testing device.
6. If the response from the test software matches the value calculated in the control device, the safety-relevant function is activated.
7. The control device sends a reply to the diagnostic software as to whether or not the activation has taken place.
8. The diagnostic software and, therefore, the workshop, which carries out such a repair, is now capable of running the activated functions.

Due to statutory provisions, the vehicle manufacturers must also enable independent workshops to carry out motor vehicle repairs and to activate the control device functions necessary therefor, even if the repair includes safety-relevant functions.

For this purpose, the motor vehicle manufacturers usually provide the manufacturers of the testing devices and/or the diagnostic software with a library, which contains the corresponding seed/key algorithms. With the aid of this library, the manufacturers of the testing devices/diagnostic software are capable of also implementing safety-relevant functions and, therefore, of also enabling independent workshops to carry out safety-relevant repairs. Making the libraries available to external parties, in particular independent workshops, poses a certain security risk, however.

One object of the present invention is to provide an improved method and an improved device for activating functions of control devices, in particular motor vehicle control devices, and to thereby provide for an improved control of the access to the functions of the control devices.

SUMMARY

A method for authorizing an external access to a control device, in particular for activating a function of a control device, where the control device is, in particular, a control device of a motor vehicle, includes the steps:
a) establishing a data link between a remote control unit and the control device;
b) transmitting a first request signal from the remote control unit to the control device;
c) activating a unit of the control device for generating a random value in response to the request signal, whereupon the unit generates a random value;
d) activating a calculation specification, which is stored in a memory of a reference value generating unit of the control device, for calculating a reference value from the random value and storing the reference value, which has been calculated by applying the calculation specification to the random value, in a memory unit of the control device;
e) transmitting the generated random value to an authentication unit, which is spatially separated from the remote control unit;
f) providing a response value corresponding to the random value using the authentication unit, in particular by calculating the response value by applying a calculation specification, which is stored in a memory of the authentication unit, to the random value;
g) transmitting the response value to the control device;
h) comparing the transmitted response value with the reference value, which was previously calculated and stored in the memory unit of the control device, using a comparator, and
i) authorizing the external access, in particular the at least one function of the control device, by an enabling unit, if the response value matches the reference value.

The activation of the at least one function of the control device may take place, in particular, by setting an activation bit at an input of an AND gate, so that a signal, which is applied to a second input of the AND gate in order to run the at least one function, is output at the output of the AND gate.

The present invention also includes a device for authorizing an external access to a control device, in particular a function of the control device, where the control device is, in particular, a control device of a motor vehicle, including: a receiver unit, which is designed for receiving at least one random value via a data link; an authentication unit including a response value generating unit for generating a response value corresponding to the random value, in particular by applying a calculation specification, which is stored in a memory of the authentication unit, to the random value in order to calculate the response value; and a transmitting unit, which is designed for transmitting the generated response value.

A system according to the present invention for authorizing an external access to a control device, in particular at least one function of the control device, where the control device is, in particular, the control device of a motor vehicle, includes a unit according to the present invention for authorizing an external access to a control device, in particular for activating at least one function of a control device; and at least one authorization verification unit, which is spatially separated from the unit for authorizing an external access to a control device and which is designed for verifying the authorization of a remote control unit, which is spatially separated from the authorization verification unit. The verification of the authorization may take place, in particular, by comparing a remote control unit identification data record received by the receiver unit with entries in an authorization list and/or a non-authorization list, which is/are stored in an authorization memory unit of the authorization verification unit.

In one possible specific embodiment, the system also includes a control device including a unit for generating a random value; a reference value generating unit, which is designed for generating at least one reference value corresponding to the random value by applying a calculation specification, which is stored in a memory of the reference value generating unit, to the random value; a memory unit for storing the generated reference value; a transmitting unit for transmitting the at least one random value; a receiver unit for receiving at least one response value; a comparator for comparing the reference value stored in the reference value memory with the at least one response value received by the receiver unit and a enabling unit for authorizing the external access to the control device, in particular the at least one function of the control device, if the at least one received response value matches the stored reference value.

In one specific embodiment, at least one remote control unit is located in a workshop and both the authorization verification unit and the authentication unit are located outside the workshop. The authorization verification unit and/or the authentication unit may be formed, in particular, in a shared central server, which is spatially separated from the remote control unit(s) and is connectable to multiple remote control units in different workshops in order to centrally administrate and assign the rights for activating control device functions.

Due to the activation, in particular, of safety-relevant functions by a central server, which is located, in particular, outside the workshop, e.g., at a manufacturer of the remote control unit, at a manufacturer of the diagnostic software and/or at an authorization service provider, the control of the activation of these functions is improved.

Since, according to the present invention, the secret algorithm and the secret key are not stored in each remote control unit, but rather in an authentication unit, which is spatially separated from the remote control unit, in particular in a central authentication unit, the risk that the secret algorithms/keys required for calculating the response value may fall into the wrong hands and be misused is substantially reduced. As a result of the access to a central authentication unit, the control of the access to the functions of the control devices may be improved and centralized.

In this way, a misuse may be prevented or at least made substantially more difficult, since the secret information and/or algorithms necessary for providing the response value no longer must be placed into the hands of a multitude of (independent) workshops. Individual functions, remote control units, such as, e.g., control and testing devices and/or workshops, may be specifically blocked if there is a risk of misuse, e.g., after a theft. The control of the access to the functions of the control device is improved in this way and the user is enabled to specifically restrict the use of individual functions, in particular safety-relevant functions.

In a further specific embodiment, the authentication unit is spatially separated from the authorization verification unit. In particular, multiple authentication units may be provided and the authorization verification unit may be designed for selecting one of the multiple authentication units for generating the response value, transmitting the random value to the selected external authentication unit, and receiving the response value from the selected external authentication unit, for example by comparing a selection criterion transmitted from the control device with entries in a select list stored in the authorization verification unit.

The external authentication units may be located, for example, at the control device and/or vehicle manufacturers and may be operated under their control.

In this way, the secret information and/or algorithms necessary for generating the response value may remain on external authentication units located at the manufacturers of the control devices and/or the vehicles. In this way, the security is increased even further, since the risk that safety-relevant information and/or algorithms will fall into the wrong hands and be misused is minimized if these remain under the direct control of the manufacturers.

The method may also include transmitting a remote control unit identification data record, which is assigned to the remote control unit, in particular bijectively, from the remote control unit to an authorization verification unit, which may be spatially separated from the remote control unit, in particular, and verifying the authorization of the remote control unit using the authorization verification unit, in particular by comparing the remote control unit identification data record transmitted from the remote control unit with entries in an authorization list and/or a non-authorization list, which are stored in an authorization memory unit of the authorization verification unit. In this way, individual remote control units may be specifically activated and/or blocked. In particular, a misplaced, in particular, stolen remote control unit may be blocked in order to prevent its misuse.

The transmission of the random value may also include transmitting a function identification value, which is assigned to the function to be activated, in particular bijectively, and which therefore enables the authorization verification unit to identify the desired function to be activated, so that the verification of the authorization and the activation may take place in a function-specific manner.

In one specific embodiment, the method may include transmitting the random value generated in the control device via the established data link from the control device to the remote control unit and from the remote control unit to the authorization verification unit and/or the authentication unit. In this way, the data transmission from the control device may take place via a conventional data interface, which is provided in every typical control device, for example, an OBD interface, without the need for modifications to the control device. In particular, in this case, there is no need to form an (additional) transmission unit in the control device for the data transmission to the authorization verification unit and/or the authentication unit.

The present invention may also include blocking the provision of a response value corresponding to the random value by the authentication unit and/or the transmission of the response value to the control device by a blocking unit if the verification of the authorization of the remote control unit yields a negative result, i.e., if the remote control unit is not authorized to run the requested function.

The verification of the authorization may include, in particular, comparing a transmitted identification data record with the entries in an authorization list and/or a non-authorization list. An authorization list ("white list") may include workshops, control devices and/or remote control units, which are authorized to run the desired functions(s); non-authorized workshops and/or non-authorized, e.g., stolen vehicles, control devices and/or remote control units may be removed from the authorization list and/or included in a non-authorization list ("black list") in order to prevent the activation of the requested function(s).

If the transmitted identification data record does not match any of the entries in the authorization list ("white list") and/or at least one of the entries in the non-authorization list ("black list"), the verification of the authorization of the remote control unit yields a negative result and the blocking unit blocks the authentication unit and/or the transmission of the response value to the control device, e.g., by setting a blocking bit at a blockade memory and/or not setting an enable bit at the input of an AND gate, so that an activation signal from the AND gate is not forwarded, but rather is blocked.

After a theft of the vehicle, the activation for all functions may be blocked by a corresponding entry in the non-authorization list; in particular, an immobilizer system may be activated in order to render the stolen vehicle useless to the thief.

The authorizations may be predefinable and/or changeable by providing a password, a personal identification number and/or a symmetrical or asymmetrical key in order to make it possible to adapt the authorizations to the present circumstances. In this way, before visiting a workshop, the owner of a vehicle may specifically activate the functions necessary for the planned repair work and exclusively for the remote control units of the visited workshop, using entries in the authorization list. The activation may also be temporary, in particular, so that the authorization automatically expires after the workshop visit.

In one specific embodiment, the method includes transmitting a feedback regarding an activation which took place or an activation which did not take place from the control device via the data link to the remote control unit; the remote control unit may then activate the authorized function and/or inform the user that the requested function has been authorized.

In one specific embodiment, the provision of a response value includes calculating the response value with the aid of a predefined, preferably secret algorithm from the random value and/or signing the random value using an asymmetrical, cryptographic method, which is based on a pair including a public key and a secret key.

In one specific embodiment, the transmission of the random value and/or the response value between the remote control unit and the authorization verification unit takes place via an electronic data link, by e-mail, fax, SMS, EMS (Enhanced Message Service), MMS (Multimedia Messaging Service), Instant Messaging (e.g., WhatsApp) and/or by telephone. The transmission via an electronic data link may take place automatically, in particular, and, in this way, allows for a particularly convenient activation of the desired function(s). A transmission by e-mail, fax, SMS, EMS (Enhanced Message Service), MMS (Multimedia Messaging Service), Instant Messaging (e.g., WhatsApp) and/or by telephone makes it possible to also activate the desired function(s) if an electronic data transmission is not possible, e.g., because a suitable data link is not available.

In one specific embodiment, the transmission of the random value and/or the response value takes place via an encrypted connection in order to prevent unauthorized data espionage and/or manipulation of the data by third parties.

Both the requests and the carried-out activations as well as all functions run by the remote control unit may be recorded in order to trace them, in particular in the event of misuse. The right to delete the records may be reserved for the owner and/or the manufacturer of the diagnostic software, the motor vehicle and/or the control device. Changes to the records are not possible, in order to avoid subsequent manipulations.

After a predefined number of unauthorized requests, an alarm message to the owner and/or the manufacturer of the motor vehicle may be triggered in order to warn of a possible attempt at misuse. The activation of the functions may also be blocked permanently or for a predefined period of time.

The functions of the control device may be assigned, in particular, to one of multiple safety classes.

A first, public safety class may include, for example, all functions which make it possible to read out information, such as, e.g., fault memories, which are intended to be available to everyone, e.g., including a roadside assistance service.

A second, restricted safety class may include all functions which are intended to be available only to the manufacturer (OEM) and workshops authorized by the manufacturer (Tier I suppliers), such as, e.g., software updates or the deletion of (error) memory entries.

After the control device has been unambiguously identified and the authorization of the workshop or the remote control unit has been confirmed, the control device may then also be reprogrammed by an independent but authenticated workshop and, in particular, may be provided with updated software.

Additional memory space may also be made available in the authentication server by the remote control unit, which is utilized for temporarily storing data during the vehicle diagnosis.

Likewise, additional memory may be made available to the control device in the authentication server, e.g., in order to implement counters. These are always made available during the vehicle diagnosis.

A third, protected safety class may include all functions which are to be available only after a deliberate authorization by the vehicle owner, so that these functions may not be carried out without the knowledge and approval of the vehicle owner. This may include, for example, the history of the GPS data of the vehicle, which make it possible to compile a movement profile of the motor vehicle or its driver.

The functions of the different safety classes may be activated using different passwords, personal identification numbers (PINs) and/or symmetrical or asymmetrical keys, each of which is known or available only to the authorized persons and/or organizations.

BRIEF DESCRIPTION OF THE DRAWINGS

One exemplary embodiment of the present invention is described in greater detail in the following with reference to the figures.

DETAILED DESCRIPTION OF EXAMPLE EMBODIMENTS

Figure 1:
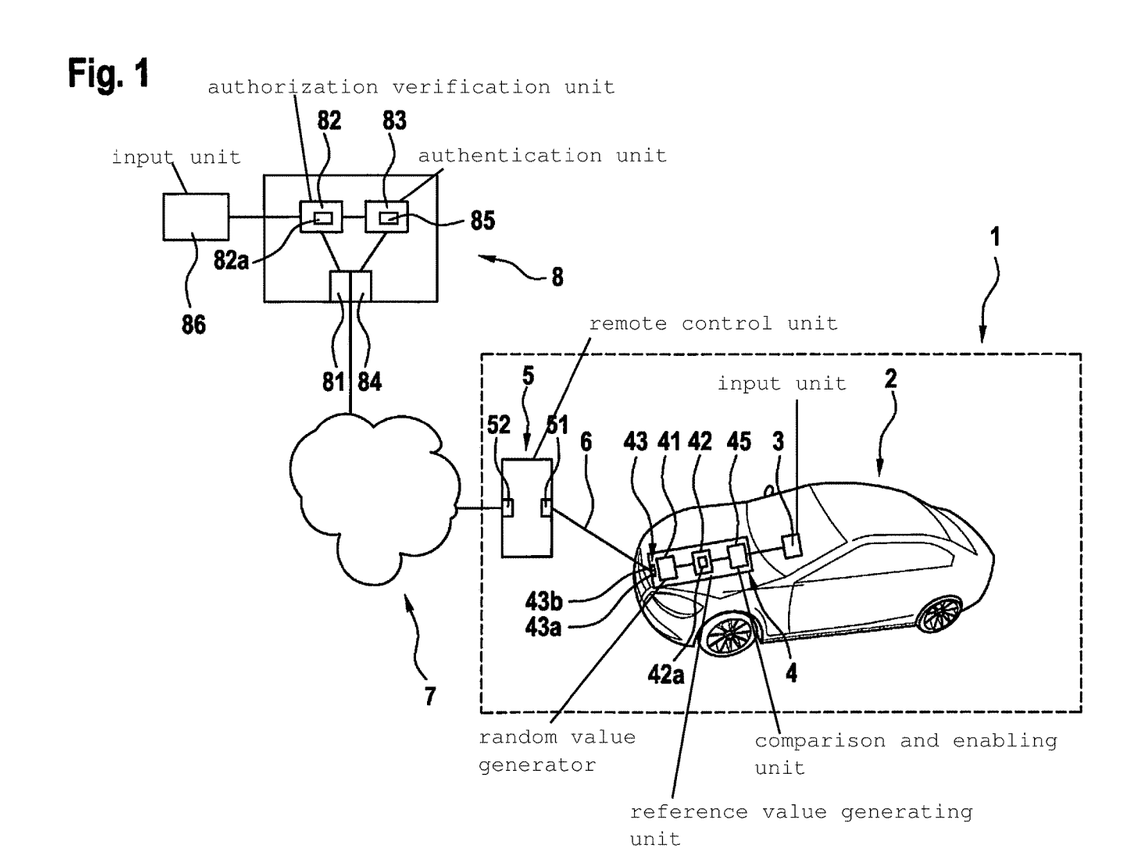
FIG. 1 shows a first exemplary embodiment of a system according to the present invention for activating functions of a control device of a motor vehicle.

FIG. 1 shows a schematic view of a first exemplary embodiment of a system according to the present invention for activating functions of a control device 4 of a motor vehicle 2.

Motor vehicle 2 is located in a workshop 1, and control device 4 of motor vehicle 2 is connected, via a suitable interface 43, e.g., a standardized vehicle communication interface (VCI), which includes a transmitting unit 43a and a receiver unit 43b, to a remote control unit (e.g., a testing and/or diagnostic device) 5 in workshop 1 in a wireless and/or wired manner via a data link 6 in such a way that a transmission of data between control device 4 and remote control unit 5 is possible.

Remote control unit 5 is connected to a central server 8 via a data link 7 designed to be wireless and/or wired, which, in particular, may also include the Internet. Central server 8 is typically located outside workshop 1 and is connectable via suitable data links 7 to multiple remote control units 5, which may be located, in particular, in different workshops 1, which are spatially separated from one another. In FIG. 1, only one data link to a single remote control unit 5 is shown for the sake of clarity.

The present invention also includes systems in which server 8 is located within workshop 1 in order to authenticate all remote control units 5 of particular workshop 1.

Remote control unit 5 places a request for the activation of a protected function of control device 4 via data link 6 established between remote control unit 5 and control device 4. In response to the request, a device for generating a random value (random value generator) 41, which is formed in control device 4, generates a random value. A reference value generating unit 42, which is also provided in control device 4, generates a reference value corresponding to the random value by applying a calculation specification stored in a memory of reference value generating unit 42 and stores the reference value in a memory unit 42a. Alternatively, the random value may also be stored in memory unit 42a, so that the associated reference value may be generated at a later time.

In addition, the random value generated by random value generator 41 is transmitted via interface 43 to a first transceiver 51 of remote control unit 5 and is further transmitted from a second transceiver 52 of remote control unit 5 to a receiver unit 81 of server 8. In addition to the random value, at least one identification data record, which is assigned to vehicle 2, control device 4, workshop 1 and/or remote control unit 5, in particular bijectively, and identifies vehicle 2, control device 4, workshop 1 and/or remote control unit 5, is also transmitted to receiver unit 81 of server 8.

The identification data record may contain, in particular, unambiguous identification features, such as, e.g., the vehicle identification number (VIN) of vehicle 2 and/or the Media Access Control address (MAC address) of remote control unit 5 and may be transmitted, encrypted and/or signed, from remote control unit 5 to receiver unit 81 of server 8.

An authorization verification unit 82 formed in server 8 verifies, on the basis of the transmitted information, in particular on the basis of the comparison of the transmitted identification data record with the data records of an authorization database, which are stored in an authorization memory unit 82a, whether remote control unit 5 and/or workshop 1 are/is authorized to activate the requested function.

If the authorization of workshop 1 and/or remote control unit 5 is given, in particular, because a data record corresponding to the transmitted identification data record is stored in authorization memory unit 82a and is not marked as blocked, an authentication unit 83, which is likewise formed within server 8, generates a response value from the transmitted random value, which response value is transmitted back to remote control unit 5 via a transmitting unit 84 of server 8 and is transmitted from first transceiver 51 of remote control unit 5 to control device 4 of vehicle 2.

For the purpose of generating the response value, authentication unit 83 includes, in particular, a response value calculating unit 85 including a memory, in which at least one secret algorithm is stored, which makes it possible to calculate a corresponding response value from the transmitted random value. The response value calculating unit 85 may also be designed as a signing unit, which signs the random value by utilizing an asymmetrical cryptographic method with a secret key, which is stored in a memory of the response value calculating unit 85.

Since, according to the present invention, the secret algorithm and the secret key are stored only on central server 8 and not in each remote control unit 5, the risk that secret algorithms/keys may fall into the wrong hands and be misused is substantially reduced.

A comparison and enabling unit 45 formed in control device 4 compares the response value transmitted from server 8 via remote control unit 5 to control device 4 with the reference value, which was previously generated from the random value by reference value generating unit 42 and stored in memory unit 42a, and activates the requested function(s) of control device 4 (only) if the received response value matches the calculated reference value.

Server 8 also includes an input unit 86, which may be designed as a keyboard, a touchscreen and/or an Internet portal, and which makes it possible for the vehicle owner or other authorized persons, e.g., employees of the manufacturer or the registration authority, to modify the authorizations for the activation of functions of control device 4 stored in authorization memory unit 82a. In this way, the authorizations may be individually adapted to the particular present situation. In particular, in the event of a planned workshop visit, the functions necessary for the intended work may be activated specifically only for visited workshop 1 and remote control units (testing and diagnostic devices) 5 available in workshop 1. After a theft of vehicle 2, all functions of control device 4 of vehicle 2 may be blocked and/or an immobilizer system may be activated in order to make vehicle 2 unusable for the thief.

In order to permit an access via an Internet portal, a suitable software may be provided, e.g., as an "app" or a PC application. Alternatively or additionally, a browser-based access may be provided.

The activation may also be coupled to a payment system in order to activate charge-based functions only after an appropriate payment ("pay-per-use") has been made.

As an alternative to or in addition to input unit 86 at server 8, an input unit 41 may also be provided at or in motor vehicle 2, which enables the driver and/or the vehicle owner to make the desired modifications to the authorizations. In this case, the inputs of the driver and/or the vehicle owner are transmitted from input unit 3 via control device 4 and remote control unit 5 to server 8 and, in particular, to authorization verification unit 82 in order to modify the entries in authorization memory unit 82a.

A precondition for the modification of entries in authorization memory unit 82a may be the provision of a password, a personal identification number and/or a symmetrical or asymmetrical key in order to effectively prevent an unauthorized access to the entries in authorization memory unit 82a.

When vehicle 2 is sold, the rights to modify the authorizations may be transferred from the seller to the buyer. In this case, the rights of the previous owner (the seller) and the authorizations assigned by this individual are terminated.

Figure 2:
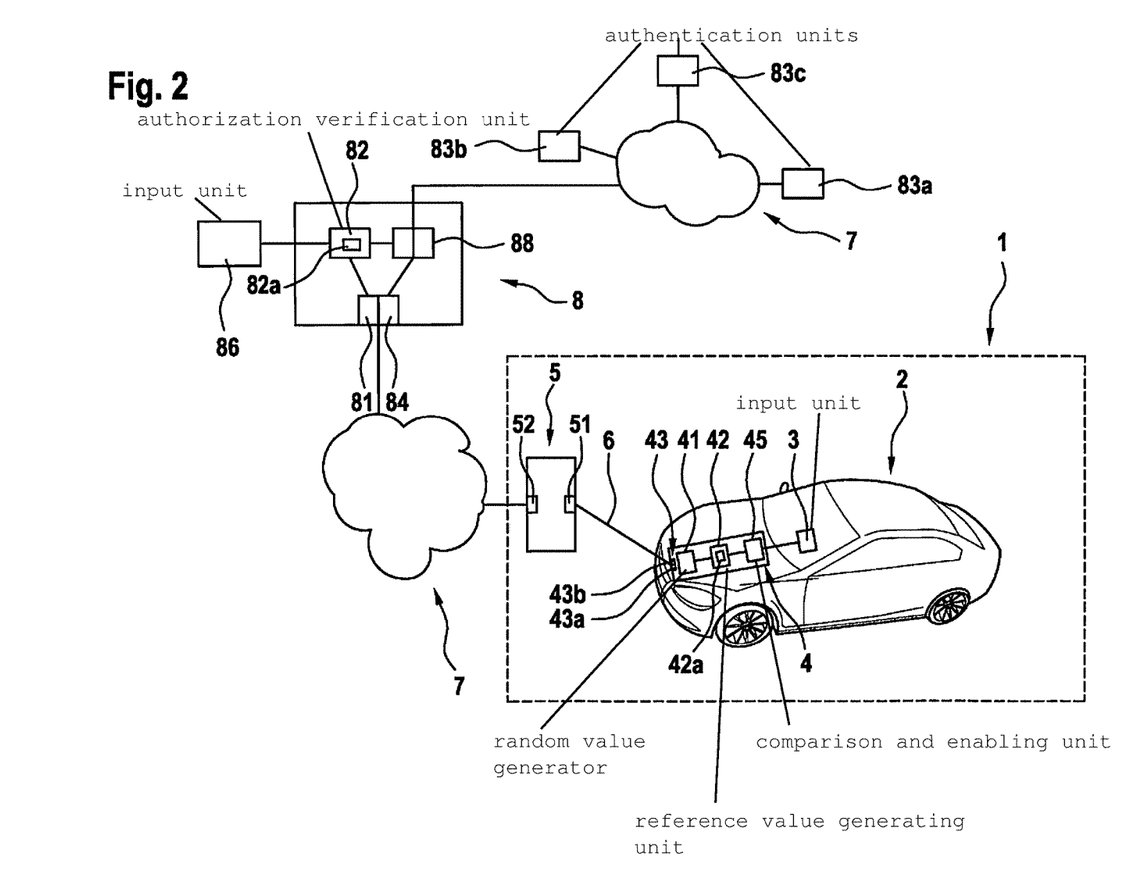
FIG. 2 shows a second exemplary embodiment of a system according to the present invention for activating functions of a control device of a motor vehicle.

FIG. 2 schematically shows a second exemplary embodiment of a system according to the present invention.

The features which match the features of the first exemplary embodiment shown in FIG. 1 are provided with the same reference numerals and are not described in detail again, in order to avoid repetition.

In contrast to the first exemplary embodiment, authentication unit 83 in the second exemplary embodiment is not formed together with authorization verification unit 82 within a shared server 8.

Instead, in addition to authorization verification unit 82, an additional transceiver 88 is provided in server 8, which is connected via at least one suitable data link 7, which may also be established, in particular, via the Internet, to external authentication units 83a, 83b, 83c, which are kept available and are operated by motor vehicle manufacturers, for example.

After authorization verification unit 82 has checked and confirmed the authorization of remote control unit 5 transmitting the random value to activate the desired function, as has been described for the first exemplary embodiment, a suitable external authentication unit 83a, 83b, 83c, in particular the authentication unit 83a, 83b, 83c of the manufacturer of control device 4 and/or motor vehicle 2, is selected by transceiver 88 and the random value is transmitted to selected authentication unit 83a, 83b, 83c. Selected authentication unit 83a, 83b, 83c calculates a response value corresponding to the transmitted random value. The response value is transmitted via data link 7, transceiver 88, and transmitting unit 84 to remote control unit 5 and from remote control unit 5 via data link 6 to control device 4 of motor vehicle 2 and is evaluated there, as has been described extensively for the first exemplary embodiment.

Due to a configuration according to the second exemplary embodiment, the safety of the system is increased even further, since the secret algorithms and/or keys necessary for calculating the response value may remain on authentication units 83a, 83b, 83c of the manufacturers and, therefore, under their complete control.

The data transmission between authorization verification unit 82, remote control unit 5 and/or the at least one authentication unit 83a, 83b, 83c may take place, in particular, in an encrypted and/or signed manner, where, in particular, an asymmetrical encryption and signature method, which is based on a pair including a secret key and a public key, may be used in order to effectively prevent a wiretapping and/or manipulation of the data on the transmission path.

The calculation of the response value by authentication units 83, 83a, 83b, 83c of the first or second exemplary embodiment may take place using a secret seed/key algorithm. Alternatively, the random value may be signed using a secret key and the signature may be verified by utilizing the public key corresponding to the secret key.

What is claimed is:

1. A method for authorizing an external access to a control device of a motor vehicle for activating a function of the control device, the method comprising:
    establishing, by a remote control device, a data link between the remote control device and the control device;
    transmitting, by the remote control device, a first request signal from the remote control device to the control device;
    activating, by the control device, a device of the control device to generate a random value in response to the request signal, whereupon the device of the control device generates a random value;
    activating, by a reference value generating unit of the control device, a calculation specification, which is stored in a memory of the reference value generating unit of the control device, for calculating a reference value from the random value and storing, by the reference value generating unit of the control device, the reference value, which has been calculated by applying the calculation specification to the random value, in a memory unit of the control device;
    transmitting, by the control device, the generated random value to an authentication device which is spatially separated from the remote control unit device;
    providing, by the authentication device, a response value corresponding to the random value by calculating the response value by applying a 2nd calculation specification, which is stored in a memory of the authentication device, to the random value;
    transmitting, by the authentication device, the response value to the control device;
    comparing, by the control device, the transmitted response value with the reference value, which was previously calculated and stored in the memory unit of the control device, using a comparator;
    authorizing the function of the control device, by an enabling unit if the response value matches the reference value;
    transmitting, by the control device, a feedback regarding at least one of: i) an activation which took place, and ii) an activation which did not take place, from the control device via the data link to the remote control device; and
    wherein the activated function includes at least one of: i) an activation of an immobilizer system, ii) a deactivation of the immobilizer system, iii) a request for data from the control device, and iv) an input of data into the control device.

2. A method for authorizing an external access to a control device of a motor vehicle for activating a function of the control device, the method comprising:
    establishing, by a remote control device, a data link between the remote control device and the control device;
    transmitting, by the remote control device, a first request signal from the remote control device to the control device;
    activating, by the control device, a device of the control device to generate a random value in response to the request signal, whereupon the device of the control device generates a random value;
    activating, by a reference value generating unit of the control device, a calculation specification, which is stored in a memory of the reference value generating unit of the control device, for calculating a reference value from the random value and storing, by the reference value generating unit of the control device, the reference value, which has been calculated by applying the calculation specification to the random value, in a memory unit of the control device;
    transmitting, by the control device, the generated random value to an authentication device which is spatially separated from the remote control device;
    providing, by the authentication device, a response value corresponding to the random value by calculating the response value by applying a 2nd calculation specification, which is stored in a memory of the authentication device, to the random value;
    transmitting, by the authentication device, the response value to the control device;
    comparing, by the control device, the transmitted response value with the reference value, which was previously calculated and stored in the memory unit of the control device, using a comparator;

authorizing the function of the control device, by an enabling unit if the response value matches the reference value; and transmitting, by the remote control device, a remote control device identification data record, which is assigned to the remote control device, bijectively, from the remote control device to an authorization verification device, which is spatially separated from the remote control device, and verifying an authorization of the remote control device by the authorization verification device by comparing the remote control device identification data record transmitted from the remote control device with entries in at least one of an authorization list and a non-authorization list, the at least one of the authorization list and the non-authorization list being stored in an authorization memory unit of the authorization verification device.

3. The method as recited in claim 2, further comprising:
transmitting the random value generated in the control device via the established data link from the control device to the remote control device and from the remote control device to at least one of the authorization verification device and the authentication device.

4. The method as recited in claim 3, further comprising:
at least one of: i) providing a response value corresponding to the random value by the authentication device and ii) blocking the transmission of the response value to the control device by a blocking unit if the verification of the authorization of the remote control device yields a negative result.

5. The method as recited in claim 2, wherein the authorization verification device and the authentication device are formed in a central server, the authentication device and the authorization verification device being formed in a shared central server.

6. The method as recited in one of claim 2, wherein the authentication device is spatially separated from the authorization verification device.

7. The method as recited in claim 6, wherein multiple authentication devices are provided and the authorization verification device is designed for selecting one of the multiple authentication devices for generating the response value by comparing a selection criterion transmitted from the control device with entries in a select list stored in the authorization verification device.

8. The method as recited in claim 2, further comprising:
transmitting a feedback regarding at least one of: i) an activation which took place, and ii) an activation which did not take place, from the control device via the data link to the remote control device.

9. The method as recited in claim 2, wherein the activated function includes at least one of: i) an activation of an immobilizer system, ii) a deactivation of the immobilizer system, iii) a request for data from the control device, and iv) an input of data into the control device.

10. The method as recited in claim 2, wherein the verification of the authorization of the remote control device includes requesting at least one of: i) a password, ii) a personal identification number, and iii) a key, and providing a response value corresponding to the random value only if the at least one of the password, the personal identification number and the key matches a value stored in the authorization verification device.

11. The method as recited in claim 10, wherein, after provision of the at least one of the password, the personal identification number, and the key, the at least one of the authorization list and the non-authorization list is at least one of: (i) predefinable, and (ii) changeable.

12. The method as recited in claim 1, wherein the calculation of the response value includes utilizing a cryptographic algorithm, which is based on an asymmetrical key pair.

13. A system for authorizing an external access to a control device of a motor vehicle for activating a function of the control device, the system comprising:
a remote control logic device which establishes a data link between the remote control device and the control device and transmits a first request signal to the control device;
a logic device of the control device, activated by the control device, to generate a random value in response to the request signal;
a reference value generating unit of the control device, which activates a calculation specification stored in a memory of the reference value generating unit, to calculate a reference value from the random value by applying the calculation specification to the random value, the reference value generating unit storing the reference value in a memory unit of the control device; and
an authentication device which is spatially separated from the remote control device, the control device transmitting the generated random value to the authentication device, the authentication device providing a response value corresponding to the random value by calculating the response value by applying a 2nd calculation specification, which is stored in a memory of the authentication device, to the random value, the authentication device transmitting the response value to the control device;
wherein the control device compares the transmitted response value with the reference value, which was previously calculated and stored in the memory unit of the control device, using a comparator, and authorizes the function of the control device, by an enabling logic unit if the response value matches the reference value, the control device transmitting a feedback regarding at least one of: i) an activation which took place, and ii) an activation which did not take place, from the control device via the data link to the remote control device, and
wherein the activated function includes at least one of: i) an activation of an immobilizer system, ii) a deactivation of the immobilizer system, iii) a request for data from the control device, and iv) an input of data into the control device.

14. A system for authorizing an external access to a control device of a motor vehicle for activating a function of the control device, the system comprising:
a remote control logic device which establishes a data link between the remote control device and the control device and transmits a first request signal to the control device;
a logic device of the control device, activated by the control device, to generate a random value in response to the request signal;
a reference value generating unit of the control device, which activates a calculation specification stored in a memory of the reference value generating unit, to calculate a reference value from the random value by applying the calculation specification to the random value, the reference value generating unit storing the reference value in a memory unit of the control device; and an authentication device which is spatially separated from the remote control device, the control device transmitting the generated random value to the authentication device, the authentication device providing a response value corresponding to the random value by calculating the response value by applying a 2nd calculation specification, which is stored in a memory of the authentication device, to the random value, the authentication device transmitting the response value to the control device;

wherein the control device compares the transmitted response value with the reference value, which was previously calculated and stored in the memory unit of the control device, using a comparator, and authorizes the function of the control device, by an enabling logic unit if the response value matches the reference value; and wherein the remote control device transmits a remote control device identification data record, which is assigned to the remote control device, bijectively, from the remote control device to an authorization verification device, which is spatially separated from the remote control device, and the authorization verification device verifies an authorization of the remote control device by comparing the remote control device identification data record transmitted from the remote control device with entries in at least one of an authorization list and a non-authorization list, the at least one of the authorization list and the non-authorization list being stored in an authorization memory unit of the authorization verification device.

* * * * *